Aug. 6, 1957    R. E. EVANS ET AL    2,801,416
MEANS FOR CONTROLLING THE VELOCITY OF PROJECTILES
Filed Aug. 7, 1952    2 Sheets-Sheet 1

INVENTORS
RICHARD E. EVANS
PHILIP R. HASKELL
BY
ATTORNEYS

United States Patent Office 2,801,416
Patented Aug. 6, 1957

2,801,416
MEANS FOR CONTROLLING THE VELOCITY OF PROJECTILES

Richard E. Evans, Southport, and Philip R. Haskell, Fairfield, Conn., assignors to Remington Arms Company, Inc., Bridgeport, Conn., a corporation of Delaware Application August 7, 1952, Serial No. 303,112

3 Claims. (Cl. 1—44.5)

This invention relates to a tool for driving studs or other fastening devices by the expansion of gases generated by the burning of a propellent powder or the release of some other expandible gaseous agent. More specifically, this invention relates to such a tool which is provided with adjustable means to control the penetrating force of the driven fastener.

Previously, the most widely used method of control of stud penetration has been the projection of the stud or other fastener with a powder charge selected from a series of charges capable of delivering progressively greater propulsive force. In such systems the stud or other fastener and the charge were either separately loaded into the tool or were arranged for selective pre-assembly in the manner of semi-fixed ammunition.

Attempts have been made to control penetrating power by providing an orifice of variable size communicating between the barrel and the atmosphere, but such attempts have not been commercially useful because of the noise, the blast effect of the high pressure escaping gas, and because of the tendency of particles of propellent powder, gas sealing means, and the like, to be forcibly propelled through the orifice.

We have found that within practical limits we can control the velocity of explosively driven studs by permitting a portion of the propellent gases to escape through an orifice of variable cross-sectional area into a closed expansion chamber. We have further found that such an expansion chamber can be of a comparatively small size and, hence, practical to use while still functioning very nearly as effectively as if the expansion were direct to atmosphere. Obviously, when the expansion takes place into a closed chamber, the gas is cooled somewhat in the chamber and then flows back through the orifice and escapes through the barrel. In this way the embarrassing effects of gas and other dangerous material escaping laterally at near peak pressure are avoided, and any propellent which failed to burn in the cartridge chamber or barrel will complete its burning in the expansion chamber.

We have also found that for maximum effectiveness in such a variable orifice design that the type of the orifice is critical. Aside from the cross-sectional area of the orifice, the most critical factor appears to be that of the length of the orifice as measured parallel to the axis of the barrel. The greater the length of the orifice along the axis, the greater the tendency to disintegration and lateral projection of the gas sealing means. We contemplate using an annular orifice as formed between the abutting ends of a tubular barrel and a tubular cartridge chamber. With such an annular orifice completely surrounding the normal path of gas down the barrel, we have been able to provide a gas escape orifice having a cross-sectional area which is at least equal to the cross-sectional area of the barrel bore with an axial length so slight that not even a cardboard over-powder wad will be materially broken up by firing.

It is our object to produce a stud driving tool capable of using factory-loaded fixed ammunition and provided with means to control the driving force so effectively as to permit the same loading to be used against work surfaces of widely different penetration resistance.

It is an additional object to produce a variable power stud driving tool which does not permit high pressure gas to escape laterally to atmosphere from any point near the chambered end of the barrel.

A supplemental object is the production of an orifice design which is capable of providing a large area orifice of minimum length which will function without substantial disturbance of the fastener or the gas sealing means therefor.

Details of a preferred embodiment as well as other objects and advantages of our invention will become apparent from consideration of the following specification referring to the attached drawings in which.

Figure 1:
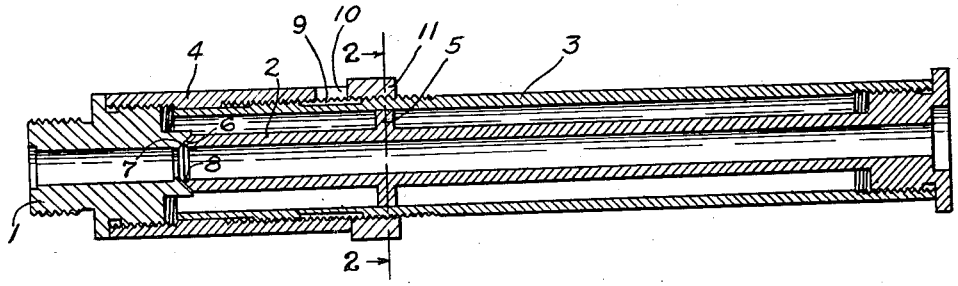
Fig. 1 is a longitudinal sectional view through the barrel assembly of a stud driving tool embodying our invention.
Figure 2:
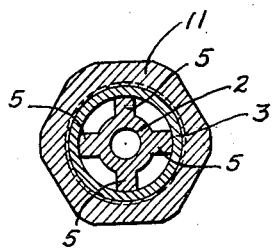
Fig. 2 is a cross-sectional view on the line 2—2 of Fig. 1.

Referring specifically to Fig. 1, it will be seen that we have illustrated a barrel assembly which can be used with any suitable breech closure and firing mechanism, for example, that shown in the copending application of M. H. Walker, Serial No. 225,146, filed May 8, 1951, now Patent No. 2,645,772, issued July 21, 1953, and entitled "Stud Driving Tool." This barrel assembly comprises a chamber portion 1 provided with threads or other means for attachment to a breech mechanism and a barrel portion 2 in axial prolongation of the chamber.

The barrel is supported in alignment with the chamber by means including a barrel sleeve 3 rigidly attached thereto and having a threadable connection with a chamber sleeve 4 which is rigidly attached to the chamber 1. Spacer blocks 5 formed integrally with or rigidly attached to the barrel or barrel sleeve assist in maintaining the barrel centered in the barrel sleeve.

The end of the barrel adjacent the chamber is formed to define a taper 6 which seats in a mating female taper 7 in the chamber 1. Obviously, when the barrel sleeve 3 is screwed into the chamber sleeve 4 to the inner limit, the two tapered sections will be in contact forming a gas-tight, self-centering joint, and the barrel and chamber will be in effect a single unit. As the barrel sleeve is screwed outwardly in the chamber sleeve, the barrel and chamber separate, leaving an annular orifice between them which has an effective cross-sectional area determined by the orifice length. Gas flow through this orifice is facilitated by flaring the bore of the barrel as at 8 to lead into the annular orifice and reduce any tendency to turbulent flow. The outer cylindrical surface of the barrel sleeve may be graduated at 9, in the same fashion as the barrel and sleeve of a conventional micrometer, to provide a ready reference for determining the actual orifice opening, and a sight port 10 may be formed in the chamber sleeve to permit viewing the graduations. A locknut 11 on the barrel sleeve is arranged to bear on the end of the chamber sleeve for maintaining a desired adjustment, or any other equivalent locking means may be used.

In the use of this barrel assembly it is contemplated that fasteners and cartridges would be assembled as fixed ammunition and factory loaded with powder having burning characteristics best suited to the stud weight. Generally, an over-powder card wad or other gas sealing means will be utilized.

When the tool is used with the barrel and chamber screwed tightly together, there can be no gas escape and the tool functions as any other stud driver does, driving its fastener to the maximum depth determined by the particular charge of powder. As the barrel sleeve is screwed outwardly in the chamber sleeve, the orifice is gradually opened to permit some of the propelling gas to escape from the barrel into the closed expansion chamber defined by the two sleeves and the exterior of the barrel. With the particular .25 caliber tool shown, the effective cross-sectional area of the orifice will approximate the cross-sectional area of the bore of the barrel when the length of the orifice is only $\frac{1}{16}''$. As the orifice is enlarged, both the muzzle velocity and the penetrating ability of the fastener fall off until an opening is reached at which the expansion chamber pressure, with that chamber volume, quickly approximates bore pressure, and pressure is rapidly equalized across the orifice. For greater orifice areas, velocity is practically independent of orifice area for that particular expansion chamber volume.

Although the phenomenon of velocity control is at least theoretically independent of the type of orifice, the annular form of the orifice here provided has great practical significance in view of the tendency of a heel cap or other gas sealing means to be extruded laterally when compressed by the pressure of powder gas acting on one side and the inertia of the stud resisting movement of the other side of the gas seal or to be eroded by the high velocity flow of gas past the sealing means as the edge of the orifice is cleared. The annular form provides for maximum orifice area with a minimum axial length of the orifice, there is no appreciable sidewise extrusion of the gas seal as it passes the orifice, and there is little or no gas erosion.

Considerable testing has resulted in the determination of certain useful design data for determining the dimensional relationships of the various elements, particularly expansion chamber volume and orifice opening. Since our invention is not limited in its application to any particular caliber, we have attempted to specify these quantities in terms independent of the caliber of the barrel. Although we realize that the interior ballistics problem presented is not capable of such a simple solution, we find that for practical purposes these quantities can be related to the cross-sectional area of the bore or to the volume of a unit length of the bore. Accordingly, in the following discussion we will discuss orifice area in terms of the ratio between the area of the orifice and of the cross-sectional area of the barrel bore (the area of a circle having the same diameter as the inside diameter of the barrel). We have also used the volume of a unit length of the barrel bore in specifying the volume of the expansion chamber.

Figure 3:
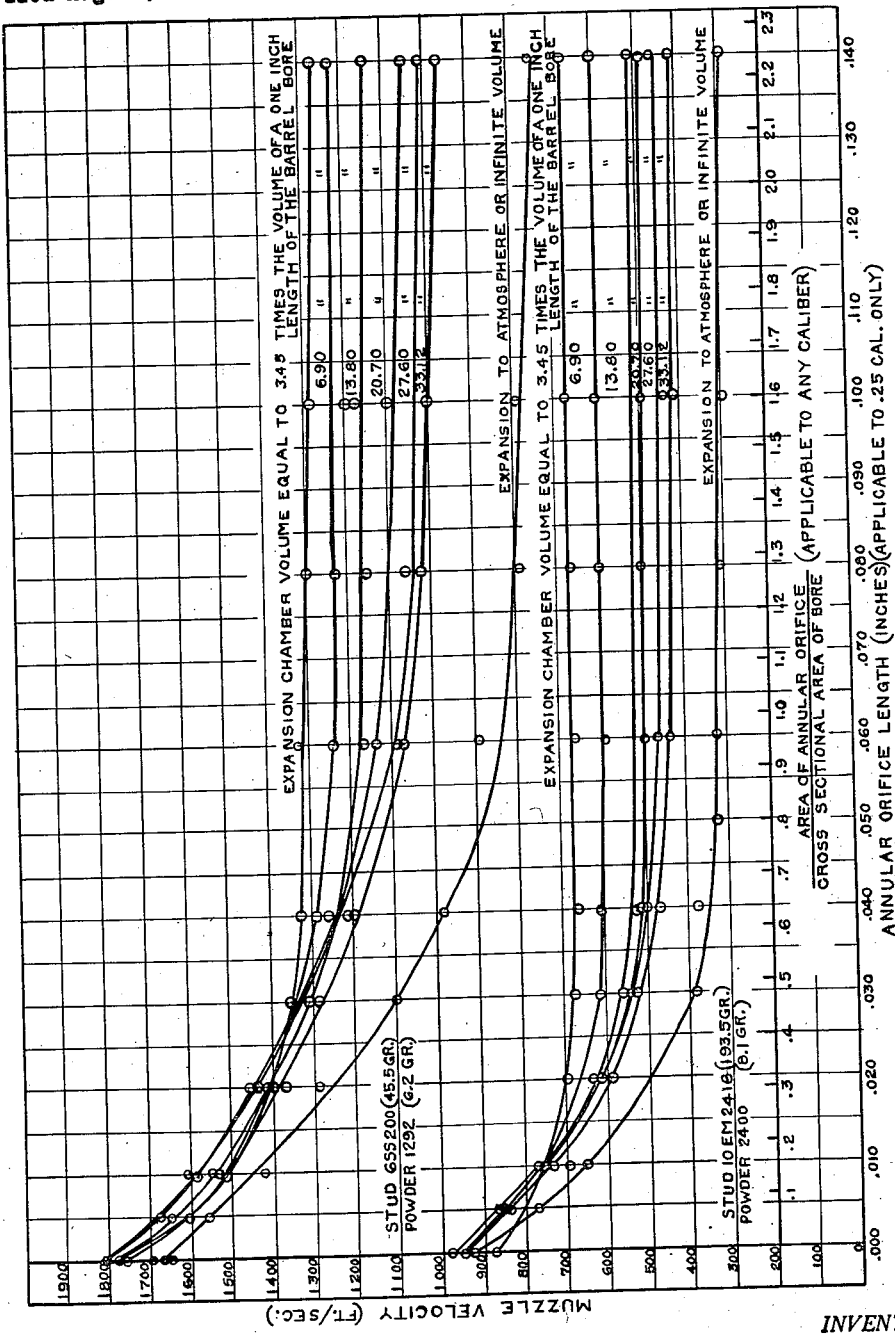
Fig. 3 is a graphical diagram on which there are plotted the muzzle velocities achieved by several different weights of stud as a function of variations in expansion chamber volume and cross-sectional area of the orifice.

In Fig. 3 we have plotted the results of a number of tests of the .25 caliber tool with the muzzle velocity as the ordinate and with the ratio of orifice area to bore cross-sectional area as the abscissa. We have also superimposed upon the latter scale a scale of orifice length in inches, applicable only to the .25 caliber tool. The upper family of curves is for a comparatively light weight stud weighing 45.5 grains and the lower family of curves is for a heavier weight stud (193.5 grains).

The cartridges for each stud were loaded with a selected powder, in such amount and of a degree of quickness determined in accordance with stud weight, to yield maximum velocity within safe pressure limits. Assuming that the cartridges have been so loaded for optimum ballistics with a particular stud weight and that the expansion ratio within the tool as determined primarily by barrel length is properly correlated with cartridge design, most of the variables in a rigorous interior ballistic solution are accounted for, and it is a reasonable approximation to design orifice and expansion chamber on the basis of their relationship to bore cross-sectional area, and to the volume of a unit length of the bore.

The different curves in each family are the result of progressively increasing the volume of the expansion chamber and the figure set down with each curve, multiplied by the volume of a one-inch length of the barrel bore, gives the volume of the expansion chamber in cubic inches. The lower curve in each family shows the effect of removing the expansion chamber entirely and expanding directly to atmosphere. Because of the terrific blast and flame involved, this is not a practical industrial application but the information is of value in establishing a limit for each family of curves.

Study of these data reveals a distinct family relationship in the curves for each stud weight tested. The curves of each family are all of the same form and as the orifice cross-sectional area is increased, each curve approaches a velocity asymptote characteristic of the particular expansion chamber volume. The approach to the asymptotic condition indicates that the expansion chamber has been filled quite promptly with gas to a pressure about equal to that in barrel and cartridge chamber, practically stopping flow through the annular orifice which, for the particular expansion chamber volume, may thereafter be materially increased in size without a significant further effect upon velocity.

The actual range of velocity reduction obtainable is seen to be a function of expansion chamber volume, having zero volume as one limit and infinity or expansion to atmosphere as the other limit. Obviously, all of the other curves of a family must lie above the infinite volume curve and, in considering the curves, it will be seen that as the volume of the expansion chamber increases above that of a fairly small volume expansion chamber, each further increase is less effective in further reducing velocity. This test confirms the conclusion of certain prior art designs to the effect that the increase of chamber volume alone affords a method of velocity control and, at the same time, reveals the practical disadvantages of that method. Considering any particular orifice area ratio, note particularly that expansion into a chamber of a volume equal in cubic inches to 3.45 times the volume of a one-inch length of the barrel bore reduces the velocity from the normal maximum attained with a closed orifice by an amount nearly 50% as much as the expansion direct to atmosphere and that the relationship between expansion chamber volume and velocity seems to be on a logarithmic scale. The lack of linearity would be a decided disadvantage in calibrating such a system and, if control were to be achieved in the upper 50% of the velocity range, it would be necessary to control expansion chamber volume to tolerances approaching the normal variations in cartridge and chamber dimensions. Reproducibility of setting would, of course, be poor.

In our system the lower limit for expansion chamber volume is set by the maximum amount of velocity reduction required. We believe that a practical lower limit in expansion chamber volume is about three times the volume of a one-inch length of the bore, which will permit nearly 50% of the maximum attainable velocity reduction. The upper limit is set only by the practical considerations of space availability, it being noted that an expansion chamber volume of thirty-three times the volume of a one-inch length of the bore is still of practical size (in the .25 caliber tool provided by a barrel sleeve roughly 6″ in length and ¾″ inside diameter) and quite effective in reducing velocity. We doubt that it will ever be necessary or practical to use an expansion chamber volume greater than about 100 times the volume of a one-inch length of the bore. Although the curves plotted are for a .25 caliber tool with which the majority of the work has been done, confirmatory tests of a .50 caliber tool driving much heavier one-half inch studs have confirmed that a similar relationship exists between orifice area/bore area ratios and velocity. The .50 caliber tool's expansion chamber had a volume determined by 72 times the volume of a one-inch length of the bore, it being practicable to go to the larger size with the heavier and bulkier tool. These curves also approached their asymptotes when orifice area equaled bore cross-sectional area.

Consideration of the lower limiting curve of expansion to infinite volume in each family would appear to indicate that variable orifice expansion direct to atmosphere would be the most effective means of obtaining variable velocity. In a theoretical sense, that seems to be true and that method has been attempted by the prior art. In a practical sense, however, that method cannot be used because of the excessively loud report, the hazardous burst of brilliant orange flame, the violent expulsion of particles of burning powder and debris from the gas sealing means, and excessive variation in muzzle velocity between successive rounds due to incomplete obturation as the gas sealing means is damaged.

We believe that the most desirable solution is to vent gas through a variable area orifice into a closed expansion chamber of the greatest volume which can be accommodated on the particular tool, noting that a volume greater than three times the volume of a one-inch length of the barrel bore is desirable to achieve a practical range of velocity control and that it will probably never be necessary to exceed one hundred times the volume of a one-inch length of the barrel bore.

These curves also serve to establish the upper practical limit for the orifice area. It will be noted that in most cases the velocity curve approaches the asymptotic condition when the area of the annular orifice approaches the cross-sectional area of the bore. This seems reasonable, for under this condition the initial flow of the gases is nearly equally divided between the two available paths and pressures rapidly equalize in the system. For use with the preferred large volume expansion chambers, it appears desirable to be able to vary the cross-sectional area of the orifice between zero and an area about equal to the bore area. If smaller expansion chambers are required by space considerations, the range may be from zero to about one-half the bore area and the maximum possible velocity reduction characteristic of that small expansion chamber will be obtained.

It may be noted at this point that we know of no other arrangement for providing a variable area orifice which can provide an orifice area greater than the cross-sectional area of the bore in so short an axial dimension along the bore. Note particularly the orifice length scale applicable to the .25 caliber tool showing that an orifice area equal to the bore area is achieved with an orifice length of .0625 inch or, fractionally expressed, one-sixteenth of an inch.

Since the annular orifice is immediately adjacent the mouth of the chamber, the powder gases are very hot and moving at high velocity. Hence, consistent with the findings in small arms where gas operating systems are located near the breech, there is little or no tendency to build up deposits of carbon or other material in the annular orifice or within the expansion chamber. However, it will be noted that the barrel and barrel sleeve may be readily removed from the assembly to open up all important parts for easy cleaning and inspection. The use of modern non-corrosive primers and powders is, of course, desirable or corrosion would present a problem unless cleaning was prompt and thorough.

We claim:

1. In a tool for driving a stud through a barrel by the expansion of a quantity of gas within a cartridge receiving chamber communicating with the barrel, means for regulating the velocity imparted to said stud by said gas comprising in combination a chamber element having a rearward cartridge receiving bore and an outwardly flaring conical mouth at the forward end of said bore, a forwardly extending chamber sleeve coaxially mounted on said chamber element, a forwardly extending barrel sleeve threadedly mounted on said chamber sleeve for longitudinal movement relative thereto, a barrel concentrically fixed within said barrel sleeve in spaced relation thereto, said barrel having a muzzle end and a chamber end, barrel mounting means at the muzzle end of said barrel sealing the end of said barrel sleeve to define a closed expansion chamber between said barrel and said barrel sleeve, a rearwardly tapered conical face on the chamber end of said barrel disposed in abutment with said chamber mouth, longitudinal movement of said barrel sleeve displacing said barrel chamber end from said chamber mouth to define between said end and said mouth an annular orifice communicating with said expansion chamber, said orifice permitting a portion of the expanding gas from a cartridge in said chamber element to escape to said closed expansion chamber.

2. The combination described in claim 1, said closed expansion chamber having a volume in cubic inches greater than a volume determined by multiplying the volume in cubic inches of a one-inch length of the barrel bore by a factor of 3.0.

3. The combination described in claim 2, said orifice means being variable in effective cross-sectional area between zero and not substantially less than the area of a circle of a diameter equal to the diameter of the bore of the barrel.

References Cited in the file of this patent

UNITED STATES PATENTS

| | | |
|---|---|---|
| 1,290,854 | Sturgeon | Jan. 7, 1919 |
| 1,480,957 | Schneider | Jan. 15, 1924 |
| 1,864,374 | Romberg et al. | June 21, 1932 |
| 1,933,694 | Allen et al. | Nov. 7, 1933 |
| 2,289,766 | Fieux | July 14, 1942 |
| 2,400,878 | Dunn | May 28, 1946 |
| 2,560,292 | Kauch | July 10, 1951 |

FOREIGN PATENTS

| | | |
|---|---|---|
| 318,280 | Italy | June 8, 1934 |